United States Patent
Wu et al.

(10) Patent No.: US 8,416,837 B2
(45) Date of Patent: Apr. 9, 2013

(54) SIGNAL MODULATION METHOD

(75) Inventors: Jiao Wu, Shenzhen (CN); Yu Xin, Shenzhen (CN); Guoping Xu, Shenzhen (CN); Lei Cao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 12/600,254

(22) PCT Filed: Nov. 19, 2007

(86) PCT No.: PCT/CN2007/003263
§ 371 (c)(1),
(2), (4) Date: Nov. 13, 2009

(87) PCT Pub. No.: WO2008/141498
PCT Pub. Date: Nov. 27, 2008

(65) Prior Publication Data
US 2010/0303126 A1    Dec. 2, 2010

(30) Foreign Application Priority Data
May 18, 2007    (CN) .......................... 2007 1 0108509

(51) Int. Cl.
*H04B 1/00* (2006.01)
(52) U.S. Cl.
USPC ......................................................... 375/146
(58) Field of Classification Search .................. 375/146, 375/130, 260, 267, 295, 298, 308; 370/208, 370/210, 338
See application file for complete search history.

(56) References Cited

U.S. PATENT DOCUMENTS

| | | | |
|---|---|---|---|
| 2004/0008616 A1* | 1/2004 | Jung et al. ...................... | 370/203 |
| 2005/0250460 A1* | 11/2005 | Cleveland ...................... | 455/134 |
| 2008/0002645 A1* | 1/2008 | Seki et al. ...................... | 370/338 |
| 2010/0008442 A1* | 1/2010 | Hellberg ...................... | 375/267 |

FOREIGN PATENT DOCUMENTS

| | | |
|---|---|---|
| CN | 1666452 | 9/2005 |
| EP | 1499053 | 1/2005 |
| JP | 11215091 A | 8/1999 |
| JP | 2003500893 A | 1/2003 |
| JP | 2005159629 A | 6/2005 |
| JP | 2006/025337 | 1/2006 |
| KR | 2006/0028150 | 3/2006 |

OTHER PUBLICATIONS

International Search Report; PCT/CN2007/003263; W. Tan; Feb. 14, 2008.

(Continued)

*Primary Examiner* — Khai Tran
(74) *Attorney, Agent, or Firm* — Bright IP Law Offices

(57) ABSTRACT

The present invention provides a signal modulation method which includes the following steps: a input signal is channel encoded, and the channel encoded signal is processed by the following one or several ways: channel scrambling, interleaving, duplicating and puncturing; the signal being processed is divided into two components I and Q, wherein the two components I and Q compose a signal pair; the signal pair is divided into more than one path, and respective path of signal is quadrature phase shift keying spectrum spreading modulated using different spectrum spreading sequence and is orthogonally modulated in order that the peak-to-average power ratio of the respective paths of signal being orthogonally modulated are obtained; and a path of signal having the smallest peak-to-average power ratio is selected to be outputted as an output signal. The signal modulation method can reduce the signal PAPR significantly, not only is propitious to the design of the power amplifier, but also reduces the cost of the power amplifier.

18 Claims, 4 Drawing Sheets

OTHER PUBLICATIONS

3GPP2 C.S0054-A, CDMA2000 High Rate Broadcast-Multicast Packet Data Air Interface Specification, v. 1.0, Feb. 14, 2006, pp. 2-113, 2-130, 2-131, 2-132.

Japanese Patent Office, Notice of Reason for Rejection in corresponding Japanese Application No. 2010-507778 mailed Aug. 21, 2012.

* cited by examiner

US 8,416,837 B2

SIGNAL MODULATION METHOD

REFERENCE TO RELATED APPLICATIONS

This application is a national stage application of and claims the benefit of PCT Application No. PCT/CN2007/003263 filed on Nov. 19, 2007. PCT Application No. PCT/CN2007/003263 filed on Nov. 19, 2007 claims the benefit of Chinese Patent Application No. 200710108509.8 filed on May 18, 2007. The disclosures of the prior applications are considered part of (and is incorporated by reference in) the disclosure of this application.

FIELD OF THE INVENTION

The present invention relates to communication field, in particular to a signal modulation method based on quadrature phase shift keying spectrum spreading (QPSK Spreading) technology.

BACKGROUND OF THE INVENTION

The third generation mobile communication system (IMT-2000) and the evolution system thereof can completely solve the main disadvantages of the first generation and the second generation mobile communication systems, and ensures that any terminal user with possession of mobile subscriber equipment can complete mobile communication and transmission of any message with anybody with a high quality in any mode at any time and any place around the world. Compared with the first generation and the second generation mobile communication systems, IMT-2000 is a generation of advanced mobile communication system. At present, the standards applied in IMT-2000 include: Time Division-Synchronous Code Division Multiple Access (TD-SCDMA) standard drawn by China, Code Division Multiple Access (CDMA) 2000 standard drawn by USA, and Wideband Code Division Multiple Access (WCDMA) drawn by Europe. Wherein, CDMA 2000 standard is widely used in North America and many other places in the world.

With the constant progress of internet and mobile communication technology and the constant improvement of living standard, mobile subscriber equipment are popularized rapidly. In order to meet the demand to high speed data service of terminal users with possession of mobile subscriber equipment, aiming at CDMA 2000, the evolution standards EV/DO and EV/DV of the CDMA 2000 are further developed and drawn up. Both EV/DO and EV/DV are enhanced technology based on CDMA 2000, and support wireless packet data service with higher speed than CDMA 2000. Wherein, EV/DO means that a voice service and a data service are respectively carried by two independent carrier waves, and EV/DV means that the voice service and the data service are transmitted on a same carrier wave. The mobile communication system based on EV/DO and EV/DV can provide abundant mobile multimedia services for terminal users.

An Enhanced Broadcast Multicast Service (EBCMCS) protocol is further proposed based on EV/DO. An EBCMCS system based on the EBCMCS protocol is mainly used for transmitting broadcast message to the mobile stations in the whole coverage area of a base station.

As shown in FIG. 1, the channel structure of the EBCMCS system in prior art comprises: a first unit 102 for channel encoding, a second unit 104 for channel scrambling, interleaving and duplicating, a third unit 106 for quadrature amplitude (QAM) modulation, and a fourth unit for orthogonal frequency division multiplexing (OFDM) modulation, wherein, the third unit 106 adopts 16 QAM modulation mode. The fourth unit 108 comprises: a protecting interval and pilot signal inserting module 1082, a QPSK spectrum spreading module 1084, an inverse fast Fourier transform (IFFT) module 1086, and a cycle prefix adding module 1088.

Correspondingly, the processing flow of the signal inputted into the EBCMCS system is: the signal inputted into the EBCMCS system is firstly channel encoded by the first unit, wherein, the channel encoding is ⅕ or ⅓ Turbo encoding; then the encoded signal is processed by the second unit by the means of channel scrambling, interleaving, duplicating and puncturing; and then the signal being punctured is divided into two paths of I path and Q path by the third unit in 16QAM modulation mode; and lastly, the input I path signal and Q path signal are respectively OFDM modulation processed by the fourth unit, and the processing flow is completed. Wherein, the OFDM modulation processing mode adopted by the EBCMCS system is multicarrier modulation; the QPSK spectrum spreading module arranged in the fourth unit is distinguished from the multicarrier modulation system which does not comprises the QPSK spectrum spreading module and adopts OFDM modulation processing mode, and is used for reducing the signal peak-to-average power rate (PAPR) of the multicarrier modulation system after the OFDM modulation.

Generally speaking, the signal PAPR in the multicarrier modulation system is obtained in this way: in the multicarrier modulation system adopting the OFDM modulation processing mode, provided that the input signal sequence which has N length is $X=[X(0), X(1), \ldots, X(N-1)]^T$, wherein, N is the number of OFDM sub-carriers. Provided that the duration time of the input signal $X(n)$ is T, then each corresponding input signal $X(n)$ is modulated onto one OFDM sub-carrier, which is to say, $\{f_n, n=0, 1, \ldots, N-1\}$. At this moment, the N OFDM sub-carriers are supposed to be orthogonal, and $f_n = n\Delta f$, $\Delta f = 1/(NT)$, wherein, T is the duration time of the OFDM signal. Finally, by adopting the formula (1), the signal being OFDM modulation processed can be expressed as:

$$x(t) = \frac{1}{\sqrt{N}} \sum_{n=0}^{N-1} X(n) e^{j2\pi f_n t}, 0 \le t \le NT \tag{1}$$

Nyquist sampling is then carried out to the signal. By adopting the formula (2), the discrete signal obtained can be expressed as:

$$x(k) = \frac{1}{\sqrt{N}} \sum_{n=0}^{N-1} X(n) e^{j\frac{2\pi}{N} kn}, 0 \le n < N \tag{2}$$

According to the formula (1) and formula (2), the PAPR obtained can be expressed as:

$$PAPR = \frac{\max_{0 \le t < NT} |x(t)|^2}{E[|x(t)|^2]} \tag{3}$$

Compared with single-carrier modulation system, the output of the multicarrier modulation system is a superposed signal of a plurality of sub-channel signals due to the OFDM modulation processing mode. Therefore, when the phase of the plurality of sub-channel signals is coincident, the instantaneous power of the superposed signal obtained will be much larger than the average power of the sub-channel signals, which results in comparatively big signal PAPR. As a result, high requirements are proposed to the linearity of the amplifier in a transmitter. If the linearity range of the amplifier can not meet the need of the sub-channel signal's change, the sub-channel signal will distort and the spectrum of the superposed signal will change, with the result that the orthogonality among sub-channel signals will be destroyed, mutual interference will be generated, and the multicarrier modulation system performance will be worsened.

Due to the fact that the EBCMCS system is also a multicarrier modulation system adopting the OFDM modulation processing mode, the EBCMCS system reduces the signal PAPR of the multicarrier modulation system after being OFDM modulation processed through further increasing the QPSK spectrum spreading module, however, the QPSK spectrum spreading modulation method adopted in the OFDM spectrum spreading module of the EBCMCS system in prior art is that only one path QPSK spectrum spreading modulation is performed for the input signal of the QPSK spectrum spreading module, therefore, the prior art does not have obvious signal PAPR reducing effect by adopting the QPSK spectrum spreading modulation method, it also has very high requirements to the linearity range of the power amplifier in the multicarrier modulation system, which not only is adverse to the design of the power amplifier, but also increases the cost of the power amplifier.

SUMMARY OF THE PRESENT INVENTION

With above-mentioned one or a plurality of problems into consideration, the present invention provides a modulation method for reducing the signal PAPR.

The signal modulation method according to the embodiments of the present invention includes the following steps: a input signal is channel encoded, and the channel encoded signal is processed by the following one or several ways: channel scrambling, interleaving, duplicating and puncturing; the signal being processed is divided into two components I and Q, wherein the two components I and Q compose a signal pair; the signal pair is divided into more than one path, and respective path of signal is quadrature phase shift keying spectrum spreading modulated using different spectrum spreading sequence and is orthogonally modulated in order that the peak-to-average power ratio of the respective paths of signal being orthogonally modulated are obtained; and a path of signal having the smallest peak-to-average power ratio is selected to be outputted as an output signal.

Wherein, the spectrum spreading sequence is generated by the following formula: $h(D)=D^{17}+D^{14}+1$. Wherein, when the signal pair is divided into M paths and the spectrum spreading sequence is $s[k]$, $k=0, \ldots, 8N_{FFT}[i]-1$, the spectrum spreading sequences respectively used for the M paths of signals are $$s^m = \{s[8N_{FFT}[i]*m], s[8N_{FFT}[i]*m+1], \ldots, s[8N_{FFT}[i]*m+M-1]\} =$$
$$\{s^m[0], s^m[1], \ldots, s^m[M-1]\}, \text{wherein, } m = 0, \ldots, M-1.$$

Wherein, when the signal pair is $C''_{I/Q}[i][k]$, $i=0, \ldots, N_{spp}-1$, $k=0, \ldots, 4N_{FFT}[i]-1$, the quadrature phase shift keying spectrum spreading modulation mode adopted by the I component of the signal pair is
$u_I[i][k]=c''_I[i][k]s[2k]-c''_Q[i][k]s[2k+1]$, and the quadrature phase shift keying spectrum spreading modulation mode adopted by the Q component of the signal pair is $u_Q[i][k]=c''_I[i][k]s[2k+1]+c''_Q[i][k]s[2k]$, wherein, $k=0, \ldots, 4N_{FFT}[i]-1$.

Wherein, the I component of the signal pair after being quadrature phase shift keying spectrum spreading modulated is
$u_I^m[i][k]=c''_I[i][k]s^m[2k]-c''_Q[i][k]s^m[2k+1]$, and the Q component of the signal pair after being quadrature phase shift keying spectrum spreading modulated is
$u_Q^m[i][k]=c''_I[i][k]s^m[2k+1]+c''_Q[i][k]s^m[2k]$, wherein, $k=0, \ldots, 4N_{FFT}[i]-1$, $m=0, \ldots, M-1$. Wherein, the signal pair after being quadrature phase shift keying spectrum spreading modulated can be expressed in complex form as:
$u^m[i][k]=u_I^m[i][k]+ju_Q^m[i][k]$.

Wherein, the signal pair after being quadrature phase shift keying spectrum spreading modulated is orthogonally modulated by the following method:

$$v^m[i][k'] = \frac{1}{\sqrt{N_{FFT}[i]}} \sum_{l=0}^{N_{FFT}[i]-1} u^m[i][l'] e^{j\frac{2\pi kl}{N_{FFT}[i]}},$$

wherein,
$v^m=\{v^m[0][0], \ldots, v^m[N_{spp}-1][N_{FFT}[i]-1]\}$, $k=0, \ldots, N_{FFT}[i]-1$, $k'=N_{FFT}[i]\times p+k$, $l'=N_{FFT}[i]\times p+l$, $i=0, \ldots, N_{spp}-1$, $p=0, \ldots, 3$, $m=0, \ldots, M-1$.

Wherein, the peak-to-average power ratio of the signal pair after being orthogonally modulated is obtained by the following method:

$$PAPR = \frac{\max_{0 \le t < NT} |x(t)|^2}{E[|x(t)|^2]},$$

wherein, $x(t)$ represents the signal pair after being orthogonally modulated. Alternatively, the peak-to-average power ratio of the signal pair after being orthogonally modulated is obtained by the following method:

$$PAPR = \max_{0 \le t < NT} |x(t)|^2,$$

and the minimum peak-to-average power ratio is obtained by the following method:

$$\hat{v} = \underset{m=0, \ldots, M-1}{\arg \min} \left( \underset{\substack{i=0, \ldots, N_{spp} \\ k=0, \ldots, N_{FFT}[i]-1}}{\max} ((v^m[i][k])^2) \right),$$

wherein, $x(t)$ represents the signal pair after being orthogonally modulated.

In the present invention, the signal inputted into the QPSK spectrum spreading module is divided into more than one path, and each path of signal is respectively QPSK spectrum spreading modulated; and when QPSK spectrum spreading modulation is being carried out, each path of signal is modulated respectively using different spectrum spreading sequence. The present invention has each path of signal of more than one path QPSK spectrum spreading modulated respectively, and adopts different spectrum spreading sequence for each path of signal, so the present invention can obtain different signal PAPRs, and can select the minimum PAPR from the entire obtained signal PAPRs. Therefore, the present invention can reduce the signal PAPR significantly, not only is propitious to the design of the power amplifier, but also reduces the cost of the power amplifier.

BRIEF DESCRIPTION OF THE DRAWINGS

The drawings in the specification provide a further understanding to the present invention and constitute a part of the application. The exemplary embodiments of the present invention and the explanation thereof are given thereafter by way of illustration only, and thus are not limitative of the present invention, and wherein.

DETAILED DESCRIPTION

The core concept of the present invention is described as follows: the signal inputted into the QPSK spectrum spreading module is divided into M paths, and each path of signal of M paths is respectively QPSK spectrum spreading modulated; and when QPSK spectrum spreading modulation is being carried out, different spectrum spreading sequence is adopted for each path of signal. The present invention has each path of signal of M paths QPSK spectrum spreading modulated respectively, and adopts different spectrum spreading sequence for each path of signal, so the present invention can obtain different signal PAPRs, and can select the minimum PAPR from the entire obtained signal PAPRs.

The embodiments of the present invention will be detailed hereinafter and reference will be made to the drawings.

Figure 1:
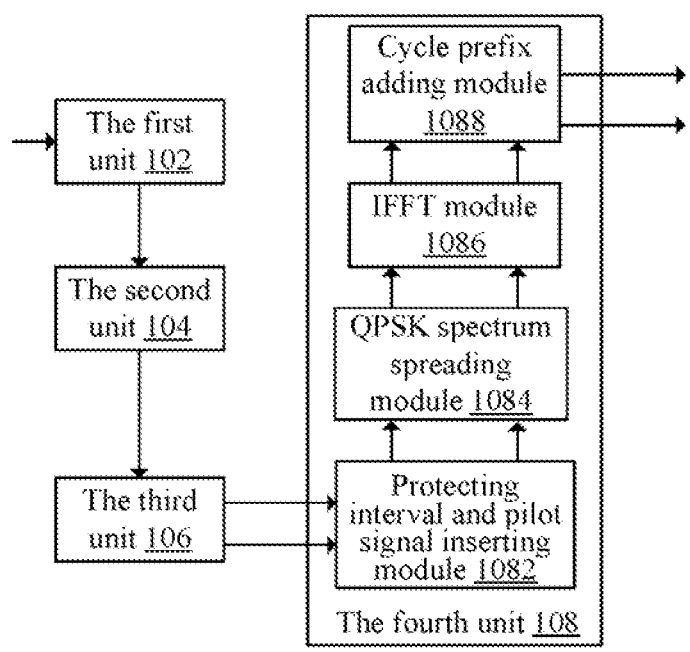
FIG. 1 is a composition schematic view of the channel structure of the EBCMCS system in prior art.

The channel structure of the signal modulation method according to the embodiment of the present invention is based on the channel structure of the EBCMCS system as shown in FIG. 1. The key difference is that the QPSK spectrum spreading modulation method adopted by the QPSK spectrum spreading module is changed. The signal modulation method according to the embodiment of the present invention comprises the following steps:

Step 1, the input signal is channel encoded by the first unit used for channel encoding, wherein, the channel encoding is ⅕ or ⅓ Turbo encoding.

Step 2, the obtained signal after being channel encoded is channel scrambled, interleaved, duplicated, and punctured by the second unit, which is connected with the first unit and is used for channel scrambling, interleaving and duplicating.

Step 3, the signal after being punctured is divided into two paths of signal I path and Q path by the third unit which is connected with the second unit and is used for QAM modulation. The two paths of signals compose a single pair. Wherein, the third unit carries out the QAM modulation by adopting the 16QAM modulation mode.

Step 4, in the fourth unit which is connected with the third unit and is used for OFDM modulation processing, the obtained signal pair, I path of signal and Q path of signal, is divided into more than one path and each path of signal is QPSK spectrum spreading modulated using different spectrum spreading sequence, the PAPR of all paths of signals are obtained, and the signal having the smallest PAPR is selected as the output signal.

Figure 2:
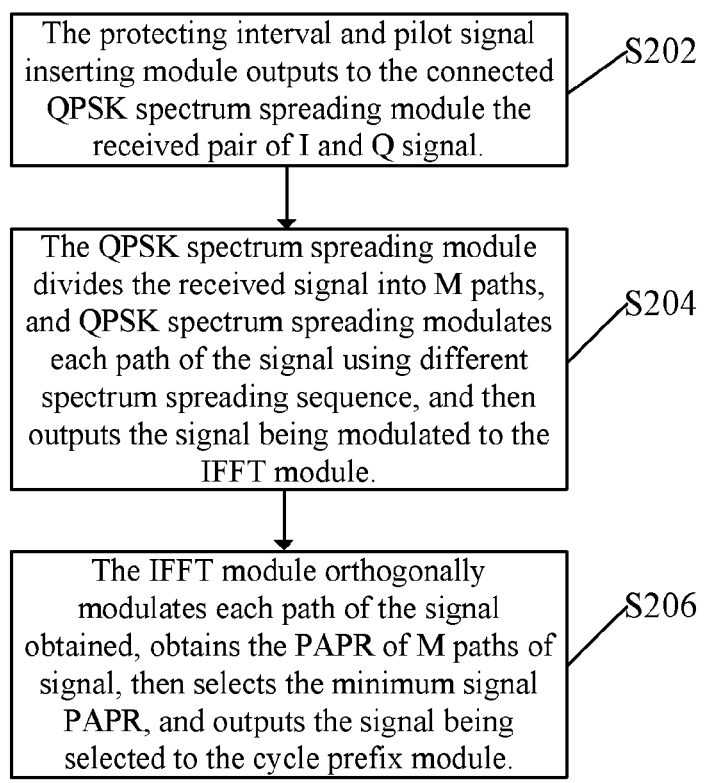
FIG. 2 is a realization flow chart of the QPSK spectrum spreading modulation mode according to the embodiment of the present invention.

Specifically, as shown in FIG. 2, step 4 includes the following steps:

S202, the protecting interval and pilot signal inserting module in the fourth unit outputs to the connected QPSK spectrum spreading module the received pair of I and Q signal.

S204, the QPSK spectrum spreading module divides the received pair of I and Q signal into M paths, and QPSK spectrum spreading modulates each path of the signal using different spectrum spreading sequence, then outputs each path of I and Q signal being QPSK spectrum spreading modulated to the IFFT module which is connected with the QPSK spectrum spreading module.

Wherein, according to the EBCMCS protocol, the spectrum spreading sequence adopted by S204 can be generated by formula (4):

$$h(D) = D^{17} + D^{14} + 1 \qquad (4)$$

Figure 3:
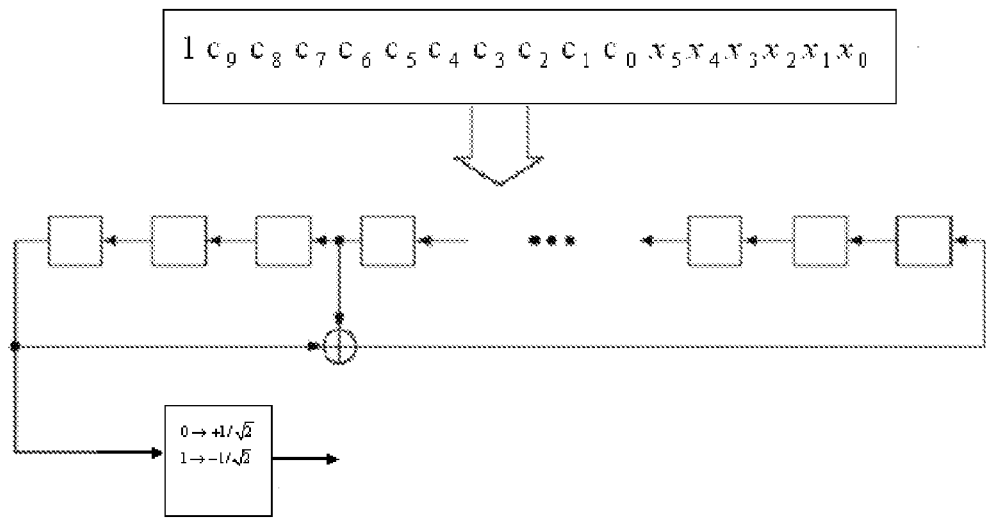
FIG. 3 is a schematic view of the generation mode of the spectrum spreading sequence according to the embodiment of the present invention.

The formula (4) is a spectrum spreading sequence generating polynomial, is also called the longest linear feedback shift register sequence, and is an m-sequence. FIG. 3 is from the EBCMCS protocol, is only a schematic view of the generation mode of spectrum spreading sequence, and does not embody the formula (4) completely.

For example, when the initial value of the register is ($1c_9 c_8 c_7 c_6 c_5 c_4 c_3 c_2 c_1 c_0 x_5 x_4 x_3 x_2 x_1 x_0$), as shown in FIG. 3, the ten bit $c_9 c_8 c_7 c_6 c_5 c_4 c_3 c_2 c_1 c_0$ is determined by frequency domain spreading seed (FDS Seed), and the six bit $x_5 x_4 x_3 x_2 x_1 x_0$ is determined by system time. The spectrum spreading sequence is generated according to the formula (4), and the generated spectrum spreading sequence also needs to be mapped according to the following mapping mode: the bit with 0 electrical signal is mapped to $+1/\sqrt{2}$, and the bit with 1 electrical signal is mapped to $-1/\sqrt{2}$. Wherein, in order to guarantee the data is synchronic, the value in the register needs to be initialized at the beginning interval of each transmitted physical layer packet.

Correspondingly, when the spectrum spreading sequence is s[k], and k=0, . . . , $8N_{FFT}[i]-1$, the different spectrum spreading sequences respectively used by each path of signal are:

$$s^m = \left\{ s[8N_{FFT}[i] * m], s\left[\frac{8N_{FFT}[i] *}{m+1}\right], \ldots, s\left[\frac{8N_{FFT}[i] *}{m+M-1}\right] \right\} \qquad (5)$$

$$= \{s^m[0], s^m[1], \ldots, s^m[M-1]\},$$

wherein, $m = 0, \ldots, M - 1$.

Wherein, $N_{FFT}[i]$ is stipulated by the EBCMCS protocol. The parameter stipulates the transform order adopted when the IFFT module is orthogonally modulating.

Figure 4:
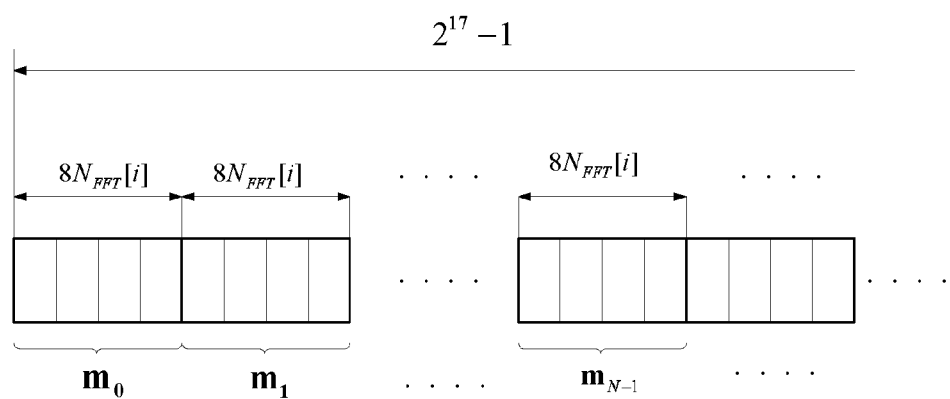
FIG. 4 is a schematic view of the spectrum spreading sequence of the first path $s^0$ adopted in the spectrum spreading sequence according to the embodiment of the present invention.

Wherein, the detailed choosing method of the spectrum spreading sequence of the first path $s^0$ adopted in the spectrum spreading sequence is shown as FIG. 4. The spectrum spreading sequence utilized is the same with the spectrum spreading sequence stipulated by the EBCMCS protocol, and to be specific, is the spectrum spreading sequence which can take part in the QPSK spectrum spreading. That is to say, the length of the m-sequence generated by the formula (4) is $2^{17}-1$, and each physical layer packet will be divided into a plurality of time slots according to the EBCMCS protocol. For example, each physical layer packet is divided into two time slots, and each time slot is comprised of 2048 code chips. With the backward compatibility problem into consideration, each time slot can deposit 1600 code chips of data. In one slot, the number of code chips in the spectrum spreading sequence that can take part in the QPSK spectrum spreading should be 1600, yet, the OFDM needs to be added with the cycle prefix, so the number of the code chips of the spectrum spreading sequence for QPSK spectrum spreading in each slot is actually $4 \times N_{FFT}[i]$ according to the EBCMCS protocol. The total number of the code chips of the spectrum spreading sequence is 1600, so $N_{FFT}[i]$ needs to be less than 400, which generally is determined as 320, 360, 384.

The signal modulation method according to the embodiment of the present invention carries out the QPSK spectrum spreading according to the spectrum spreading modulation mode as shown in formula (6) and formula (7). As shown in formula (6) and formula (7), the I path signal and the Q path signal need to utilize different spectrum spreading sequences, and s[2k] and s[2k+1] are utilized in the formula (6) and formula (7). When the QPSK spectrum spreading is carried out in each time slot, the code chip number of the spectrum spreading sequence adopted is $8 \times N_{FFT}[i]$. Correspondingly, one spectrum spreading sequence with minimum signal PAPR out of $N \times N_{FFT}[i]$ spectrum spreading sequences is selected to be transmitted, and the serial number of the selected spectrum spreading sequence is transmitted to the receiving end.

S206, the IFFT module obtains and orthogonally modulates each path of I and Q signal which have been QPSK spectrum spreading modulated, after obtaining the PAPR of M paths of I and Q signal, selects one path of signal with the minimum signal PAPR as output signal, and outputs the signal being selected to the cycle prefix adding module, which is connected with the IFFT module.

For example, when the I and Q signal pair received in step S202 is $C''_{I/Q}[i][k]$, wherein $i=0, \ldots, N_{spp}-1$, $k=0, \ldots, 4N_{FFT}[i]-1$, the QPSK spectrum spreading modulation method according to the embodiment of the present invention includes the following steps:

S202, the protecting interval and pilot signal inserting module in the fourth unit outputs the received pair of I and Q signal $C''_{I/Q}[i][k]$ to the QPSK spectrum spreading module which is connected with the protecting interval and pilot signal inserting module.

S204, the QPSK spectrum spreading module divides the received signal into M paths, and QPSK spectrum spreading modulates each path of the signal using different spectrum spreading sequence.

At this moment, each path of signal is QPSK spectrum spreading modulated, and obtain a pair of I and Q signal $u_{I/Q}[i][k]$ which have been QPSK spectrum spreading modulated, wherein, $i=0, \ldots, N_{spp}-1$, $k=0, \ldots, 4N_{FFT}[i]-1$, and $N_{FFT}[i]$, $N_{spp}$ are stipulated by the EBCMCS protocol, then, the QPSK spectrum spreading modulation mode adopted is:

$$u_I[i][k]=c''_I[i][k]s[2k]-c''_Q[i][k]s[2k+1], \text{ wherein,}$$
$$k=0,\ldots, 4N_{FFT}[i]-1 \quad (6)$$

$$u_Q[i][k]=c''_I[i][k]s[2k+1]+c''_Q[i][k]s[2k], \text{ wherein,}$$
$$k=0,\ldots, 4N_{FFT}[i]-1 \quad (7)$$

Each path of the signal out of M paths is respectively QPSK spectrum spreading modulated according to the formula (6) and formula (7), and then each path of signal being QPSK spectrum spreading modulated is outputted to the connected IFFT module.

Wherein, when each path of the signal in M paths adopts different spectrum spreading sequences obtained according to the formula (5), and each path of the signal in M paths is QPSK spectrum spreading modulated according to the formula (6) and formula (7) correspondingly, and obtains each path of I and Q signal being QPSK spectrum spreading modulated, to be specific:

$$u_I^m[i][k]=c''_I[i][k]s^m[2k]-c''_Q[i][k]s^m[2k+1],$$

wherein, $k=0, \ldots, 4N_{FFT}[i]-1$ $$u_Q^m[i][k]=c''_I[i][k]s^m[2k+1]+c''_Q[i][k]s^m[2k],$$

wherein, $k=0, \ldots, 4N_{FFT}[i]-1$, $m=0, \ldots, M-1$.

Wherein, each path of the signal being QPSK spectrum spreading modulated can be expressed in complex form as: $u^m[i][k]=u_I^m[i][k]+ju_Q^m[i][k]$.

S206, the IFFT module obtains each path of I and Q signal which have been QPSK spectrum spreading modulated, orthogonally modulates each path of the I and Q signal obtained. Wherein, when the obtained signal being orthogonally modulated is $v^m[i][k']$, the orthogonally modulation mode adopted is:

$$v^m[i][k'] = \frac{1}{\sqrt{N_{FFT}[i]}} \sum_{l=0}^{N_{FFT}[i]-1} u^m[i][l']e^{j\frac{2\pi kl}{N_{FFT}[i]}}.$$

Wherein, $v^m=\{v^m[0][0], \ldots, v^m[N_{spp}-1][N_{FFT}[i]-1]\}$, $k=0, \ldots, N_{FFT}[i]-1$, $k'=N_{FFT}[i] \times p+k$, $l'=N_{FFT}[i] \times p+l$, $i=0, \ldots, N_{ssp}-1$, $p=0, \ldots, 3$, and $m=0, \ldots, M-1$.

Wherein $x(t)$ represents the signal being orthogonally modulated. And the signal PAPR of each path of the signal being orthogonally modulated is correspondingly calculated according to the formula (3). The signal PAPR means the ratio of the peak signal power to the average signal power in consideration of the entire signals being orthogonally modulated.

After obtaining all signal PAPRs finally, the signal with the minimum signal PAPR is selected as output signal, and the signal being selected is outputted to the connected cycle prefix adding module.

Wherein, the complex multiplying operation of the QPSK spectrum spreading modulation mode to the signal is equivalent to scrambling the phase of the signal without influence on the average power of the signal. Therefore, in step S206, the calculating of the signal PAPR of each path of signal being orthogonally modulated according to the formula (3) can be further simplified as:

$$PAPR = \max_{0 \le t < NT} |x(t)|^2.$$

That is to say, the signal PAPR calculation formula is simplified as calculating the peak power of all the signals being orthogonally modulated. Wherein, when $x(t)$ represents the signal after being orthogonally modulated, the signal PAPR selection formula is:

$$\hat{v} = \underset{m=0,\ldots,M-1}{\arg\min}\left(\underset{\substack{i=0,\ldots,N_{spp}\\k=0,\ldots,N_{FFT}[i]-1}}{\max}((v^m[i][k])^2)\right).$$

Figure 5:
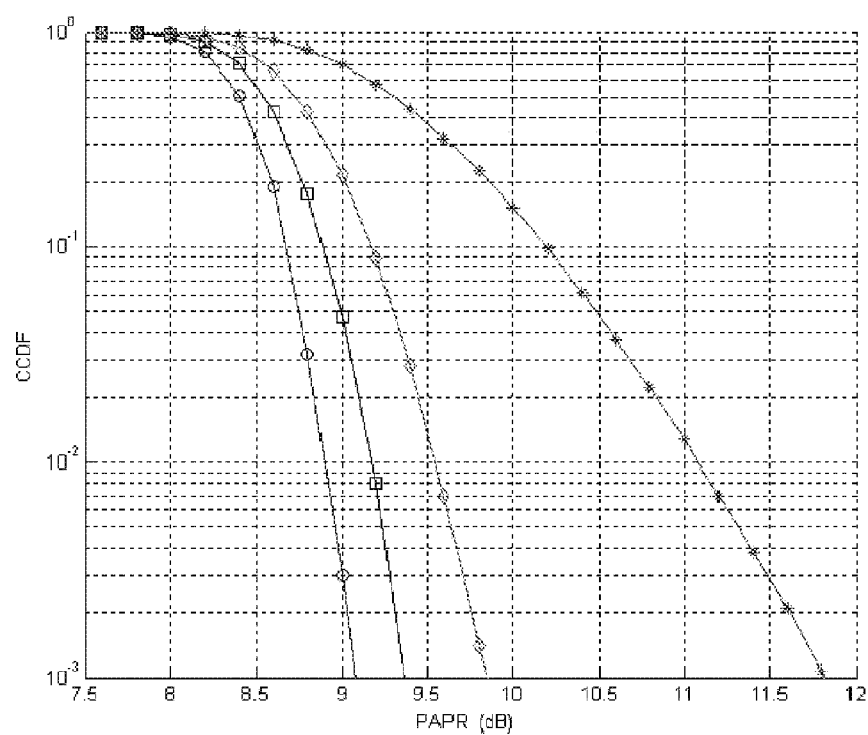
FIG. 5 is a schematic view of contrasting the signal PAPR reducing effects by adopting the method according to the embodiment of the present invention and the method of QPSK spectrum spreading modulation in prior art.

Since the receiving end can not acquire the spectrum spreading sequence selected, the information of selection needs to be transmitted as sideband message to the receiving end to be used for demodulation, so the data volume of the signal needing to be transmitted is $\log_2(M)$ bits. FIG. 5 is a schematic view of contrasting the signal PAPR reducing effects by adopting the method according to the embodiment of the present invention and the method of QPSK spectrum spreading modulation in prior art. In FIG. 5, the abscissa is the signal PAPR, and the ordinate is the functional value of the complementary cumulative density function (CCDF) of corresponding signal PAPR. The schematic view as shown in FIG. 5 is a curve chart which embodies the function distribution of the CCDF. The contrast of the signal PAPRs obtained by adopting different spectrum spreading modes can be seen visibly from the curve chart. FIG. 5 includes the distribution curve chart of the CCDF of the signal PAPR which is obtained by adopting the QPSK spectrum spreading mode according to the embodiment of the present invention when M=4, M=8, and M=16.

FIG. 5 takes the sign * to represent the signal PAPR obtained after QPSK spectrum spreading modulation using the QPSK spectrum spreading mode in prior art, and all the other signs represent the signal PAPR obtained after QPSK spectrum spreading modulation using the QPSK spectrum spreading mode according to the embodiment of the present invention. Wherein, the curve labeled by the sign ○ represents the signal PAPR obtained after being QPSK spectrum spreading modulated when M=16; the curve labeled by the sign □ represents the signal PAPR obtained after being QPSK spectrum spreading modulated when M=8; the curve labeled by the sign ◇ represents the signal PAPR obtained after being QPSK spectrum spreading modulated when M=4.

As shown in FIG. 5, when M=4, M=8, and M=16, the method adopting the embodiment of the present invention can better restrain and reduce the signal PAPR in comparison with the method adopting the prior art.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of protection of the present invention.

What is claimed is:

1. A signal modulation method is characterized in that the method includes the following steps:
   an input signal is channel encoded, and the channel encoded signal is processed by the following one or several ways: channel scrambling, interleaving, duplicating and puncturing;
   the signal being processed is divided into two components I and Q, wherein the two components I and Q compose a signal pair;
   the signal pair is divided into more than one path, and each respective path of signal is quadrature phase shift keying spectrum spreading modulated using a different spectrum spreading sequence and is orthogonally modulated in order that a peak-to-average power ratio of the respective path of signal being orthogonally modulated is obtained; and
   a path of signal having the smallest peak-to-average power ratio is selected to be outputted as an output signal,
   wherein the spectrum spreading sequence is generated by the following formula:

$$h(D)=D^{17}+D^{14}+1.$$

2. The signal modulation method according to claim 1 is characterized in that when the signal pair is divided into M paths and the spectrum spreading sequence is S[k], k=0, ..., $8N_{FFT}[i]-1$, the spectrum spreading sequences respectively used for the M paths of signals are $s^m=\{s[8N_{FFT}[i]*m], s[8N_{FFT}[i]*m+1], \ldots, s[8N_{FFT}[i]*m+M-1]\}=\{s^m[0], s^m[1], \ldots, s^m[M-1]\}$, wherein, m=0, ..., M-1.

3. The signal modulation method according to claim 2 is characterized in that when the signal pair is $C''_{I/Q}[i][k]$, i=0, ..., $N_{spp}-1$, k=0, ..., $4N_{FFT}[i]-1$, the quadrature phase shift keying spectrum spreading modulation mode adopted by the I component of the signal pair is $u_I[i][k]=c''_I[i][k]s[2k]-c''_Q[i][k]s[2k+1]$, and the quadrature phase shift keying spectrum spreading modulation mode adopted by the Q compment of the signal pair is $u_Q[i][k]=c''_I[i][k]s[2k+1]+c''_Q[i][k]s[2k]$, wherein, k=0, ..., $4N_{FFT}[i]-1$.

4. The signal modulation method according to claim 3 is characterized in that the I component of the signal pair after being quadrature phase shift keying spectrum spreading modulated is $u_I^m[i][k]=c''_I[i][k]s^m[2k]-c''_Q[i][k]s^m[2k+1]$, and the Q component of the signal pair after being quadrature phase shift keying spectrum spreading modulated is $u_Q^m[i][k]=c''_I[i][k]s^m[2k+1]+c''_Q[i][k]s^m[2k]$, wherein, k=0, ..., $4N_{FFT}[i]-1$, m=0, ..., M-1.

5. The signal modulation method according to claim 4 is characterized in that the signal pair after being quadrature phase shift keying spectrum spreading modulated can be expressed m complex form as: $u^m[i][k]=u_I^m[i][k]+ju_Q^m[i][k]$.

6. The signal modulation method according to claim 4 is characterized in that the signal pair after being quadrature phase shift keying spectrum spreading modulated is orthogonally modulated by the following method:

$$v^m[i][k'] = \frac{1}{\sqrt{N_{FFT}[i]}}\sum_{l=0}^{N_{FFT}[i]-1} u^m[i][l']e^{j\frac{2\pi kl}{N_{FFT}[i]}},$$

wherein,
$v^m=\{v^m[0][0], \ldots, v^m[N_{spp}-1][N_{FFT}[i]-1]\}$, k=0, ..., $N_{FFT}[i]-1$, k'=$N_{FFT}[i]\times p+k$, l'=$N_{FFT}[i]\times p+l$, i=0, ..., $N_{spp}-1$, p=0, ..., 3, m=0, ..., M-1.

7. The signal modulation method according to claim 6 is characterized in that the peak-to-average power ratio of the signal pair after being orthogonally modulated is obtained by the following method:

$$PAPR = \frac{\underset{0\leq t<NT}{\max}|x(t)|^2}{E[|x(t)|^2]}$$

wherein, x(t) represents the signal pair after being orthogonally modulated.

8. The signal modulation method according to claim 6 is characterized in that the peak-to-average power ratio of the signal pair after being orthogonally modulated is obtained by the following method:

$$PAPR = \max_{0 \le t < NT} |x(t)|^2,$$

and the minimum peak-to-average power ratio is obtained by the following method:

$$\hat{v} = \arg\min_{m=0,\ldots,M-1}\left(\max_{\substack{i=0,\ldots,N_{spp} \\ k=0,\ldots,N_{FFT}[i]-1}} ((v^m[i][k])^2)\right),$$

wherein, x(t) represents the signal pair after being orthogonally modulated.

9. The signal modulation method according to claim 5 is characterized in that the signal pair after being quadrature phase shift keying spectrum spreading modulated is orthogonally modulated by the following method:

$$v^m[i][k'] = \frac{1}{\sqrt{N_{FFT}[i]}} \sum_{l=0}^{N_{FFT}[i]-1} u^m[i][l']e^{j\frac{2\pi kl}{N_{FFT}[i]}},$$

wherein,
$v^m = \{v^m[0][0], \ldots, v^m[N_{spp}-1][N_{FFT}[i]-1]\}$, k=0, ..., $N_{FFT}[i]-1$, k'=$N_{FFT}[i]\times p+k$, l'=$N_{FFT}[i]\times p+l$, i=0, ..., $N_{spp}-1$, p=0, ..., 3, and m=0, ..., M−1.

10. A system, comprising:
multiple base stations configured to transmit data to mobile stations,
wherein the base stations are configured to (i) encode an input signal, (ii) provide the encoded signal on multiple signal paths, (iii) use different spectrum spreading sequences to perform quadrature phase shift keying (QPSK) spectrum spreading modulation on the signal paths, respectively, (iv) perform orthogonal modulation on the QPSK spectrum spreading modulated signal paths and determine respective peak-to-average power ratios, (v) select a signal path from the orthogonally modulated signal paths based on the peak-to-average power ratios, and (vi) transmit a signal to one or more mobile stations based on a signal associated with the selected signal path,
wherein the base stations are configured to generate the spectrum spreading sequences based on the following formula:

$h(D) = D^{17} + D^{14} + 1$

11. The system of claim 10, wherein the base stations are configured to divide the encoded input signal into M number of signal paths and generate the spectrum spreading sequences based on s[k], k=0, ..., $8N_{FFT}[i]-1$, wherein the spectrum spreading sequences respectively used for the M number of signal paths are based on
$s^m = \{s[8N_{FFT}[i]*m], s[8N_{FFT}[i]*m+1], \ldots, s[8N_{FFT}[i]*m+M-1]\} = \{s^m[0], s^m[1], \ldots, s^m[M-1]\}$, wherein m=0, ..., M−1.

12. The system of claim 11, wherein each signal path is configured to carry a signal pair comprising I and Q component, wherein the system is characterized in that when the signal pair is $C''_{I/Q}[i][k]$, i=0, ..., $N_{ssp}-1$, k=0, ..., $4N_{FFT}[i]-1$, a QPSK spectrum spreading modulation mode adopted by the I component of the signal pair is $u_I[i][k] = c''_I[i][k]s[2k] - c''_Q[i][k]s[2k+1]$, and a QPSK spectrum spreading modulation mode adopted by the Q component of the signal pair is
$u_Q[i][k] = c''_I[i][k]s[2k+1] + c''_Q[i][k]s[2k]$, wherein k=0, ..., $4N_{FFT}[i]-1$.

13. The system of claim 12, wherein the I component of the signal pair after being QPSK spectrum spreading modulated is $u_I^m[i][k] = c''_I[i][k]s^m[2k] - c''_Q[i][k]s^m[2k+1]$, and the Q component of the signal pair after being QPSK spectrum spreading modulated is $u_Q^m[i][k] = c''_I[i][k]s^m[2k+1] + c''_Q[i][k]s^m[2k]$, wherein k=0, ..., $4N_{FFT}[i]-1$ and m=0, ..., M−1.

14. The system of claim 13, wherein the signal pair after being quadrature phase shift keying spectrum spreading modulated is expressed in complex form as:
$u^m[i][k] = u_I^m[i][k] + ju_Q^m[i][k]$.

15. The system of claim 14, wherein the base stations are configured to perform orthogonal modulation on a QPSK spectrum spreading modulated version of the signal pair based on:

$$v^m[i][k'] = \frac{1}{\sqrt{N_{FFT}[i]}} \sum_{l=0}^{N_{FFT}[i]-1} u^m[i][l']e^{j\frac{2\pi kl}{N_{FFT}[i]}},$$

wherein $v^m = \{v^m[0][0], \ldots, v^m[N_{spp}-1][N_{FFT}[i]-1]\}$, k=0, ..., $N_{FFT}[i]-1$, k'=$N_{FFT}[i]\times p+k$, l'=$N_{FFT}[i]\times p+l$, i=0, ..., $N_{spp}-1$, p=0, ..., 3, and m=0, ..., M−1.

16. The system of claim 13, wherein the base stations are configured to perform orthogonal modulation on a QPSK spectrum spreading modulated version of the signal pair based on:

$$v^m[i][k'] = \frac{1}{\sqrt{N_{FFT}[i]}} \sum_{l=0}^{N_{FFT}[i]-1} u^m[i][l']e^{j\frac{2\pi kl}{N_{FFT}[i]}},$$

wherein $v^m = \{v^m[0][0], \ldots, v^m[N_{spp}-1][N_{FFT}[i]-1]\}$, k=0, ..., $N_{FFT}[i]-1$, k'=$N_{FFT}[i]\times p+k$, l'=$N_{FFT}[i]\times p+l$, i=0, ..., $N_{spp}-1$, p=0, ..., 3, and m=0, ..., M−1.

17. The system of claim 16, wherein the base stations are configured to determine a peak-to-average power ratio (PAPR) of an orthogonally modulated version of the signal pair based on:

$$PAPR = \frac{\max_{0 \le t < NT} |x(t)|^2}{E[|x(t)|^2]}$$

wherein x(t) represents the orthogonally modulated version of the signal pair.

18. The system of claim 16, wherein the base stations are configured to determine a peak-to-average power ratio (PAPR) of an orthogonally modulated version of the signal pair based on:

$$PAPR = \max_{0 \le t < NT} |x(t)|^2$$

wherein x(t) represents the orthogonally modulated version of the signal pair, wherein the base station is configured to determine a minimum peak-to-average power ratio based on:

$$\hat{v} = \underset{m=0,\ldots,M-1}{\arg\min}\left(\underset{\substack{i=0,\ldots,N_{spp}\\k=0,\ldots,N_{FFT}[i]-1}}{\max}((v^m[i][k])^2)\right)$$

(5)

wherein selecting the signal path comprises selecting a signal path that is associated with the minimum peak-to-average power ratio.

\* \* \* \* \*